United States Patent

[11] 3,602,878

[72] Inventor Lawrence B. Sullivan
    Richardson, Tex.
[21] Appl. No. 815,930
[22] Filed Apr. 14, 1969
[45] Patented Aug. 31, 1971
[73] Assignee Texas Instruments Incorporated
    Dallas, Tex.

[54] METHOD AND APPARATUS FOR GENERATING ENHANCED ACOUSTIC WAVES
    6 Claims, 7 Drawing Figs.
[52] U.S. Cl. ................................................. 340/7 R
[51] Int. Cl. ................................................. G01v 1/00
[50] Field of Search ........................................... 340/7;
    181/.5 H

[56] References Cited
UNITED STATES PATENTS
3,304,533 2/1967 Huckebay et al. ............ 340/7
3,437,170 4/1969 Brock et al. ................ 340/7

Primary Examiner—Rodney D. Bennett, Jr.
Assistant Examiner—Joseph G. Baxter
Attorneys—James O. Dixon, Andrew M. Hassell, Harold Levine and Melvin Sharp ABSTRACT: A plurality of air guns are streamed along a marine traverse, certain of the air guns having different volume capacities to generate acoustic waves having different frequency contents and pressure wave characteristics. Circuitry is provided to sequentially fire the air guns such that the first high energy oscillations of all the acoustic waves occur at the same time, thereby providing a resultant acoustic signal having an enhanced high energy oscillation.

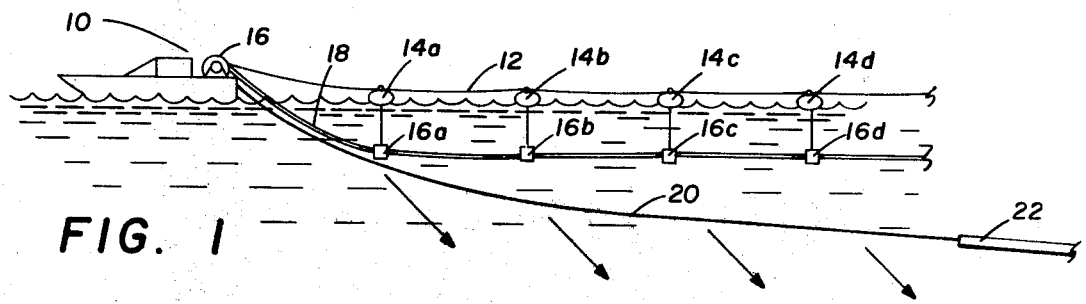
FIG. 1
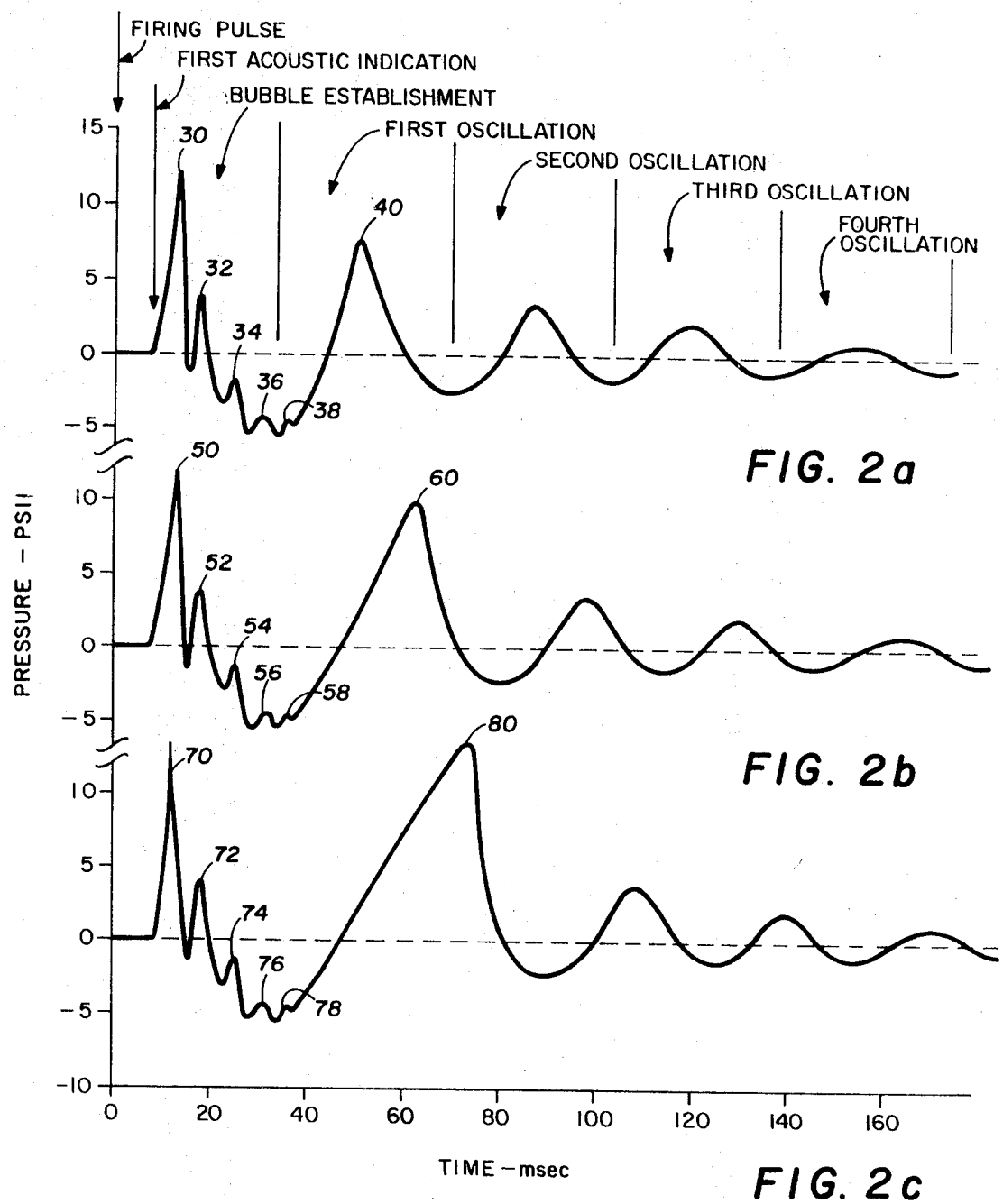
FIG. 2a
FIG. 2b
FIG. 2c

METHOD AND APPARATUS FOR GENERATING ENHANCED ACOUSTIC WAVES

This invention relates to seismic exploration, and more particularly to the enhancement of preselected portions of acoustic waves generated during marine seismic exploration.

It has been found advantageous in marine seismic exploration to generate a plurality of acoustic waves from an array of acoustic wave generators in order to provide a composite acoustic wave of satisfactory amplitude and frequency content. In particular, arrays of air guns which suddenly release confined volumes of high-pressure gas have often been utilized to generate a composite acoustic output for marine seismic exploration. Air guns having various volume capacities are generally utilized in such arrays in order to produce a composite acoustic wave having a broad frequency band, as air guns of different volumes generate acoustic waves with different frequency spectrums.

Such arrays of air guns having various volume capacities have generally been simultaneously fired. However, air guns with different volume capacities produce acoustic waves with different pressure wave characteristics, such that the pressure oscillations of highest energy of the various acoustic waves occur at different times. The simultaneous firing of such air guns thus results in cancellation and degradation of the most useful highest energy portions of the acoustic waves.

In accordance with the present invention, a plurality of seismic disturbance generators are streamed along a marine traverse. Seismic disturbances are sequentially generated along the marine traverse, with the disturbance having different frequency spectrums and pressure wave characteristics. The intervals between the seismic disturbances are timed such that selected portions of the pressure wave characteristics of the waves are enhanced.

In a more specific aspect of the invention, underwater seismic disturbances are sequentially generated by air guns with different volume capacities such that the first high energy bubble oscillations of the disturbances occur generally simultaneously to produce an enhanced resultant acoustic wave.

For a more complete understanding of the present invention and for further objects and advantages thereof, reference is now made to the following description taken in conjunction with the accompanying drawings, in which:

FIG. 1 is a somewhat diagrammatic illustration of a seismic exploration system according to the invention;

FIGS. 2a–c are waveforms illustrating the pressure waves caused by firing of air guns having different volume capacities;

Figure 4:
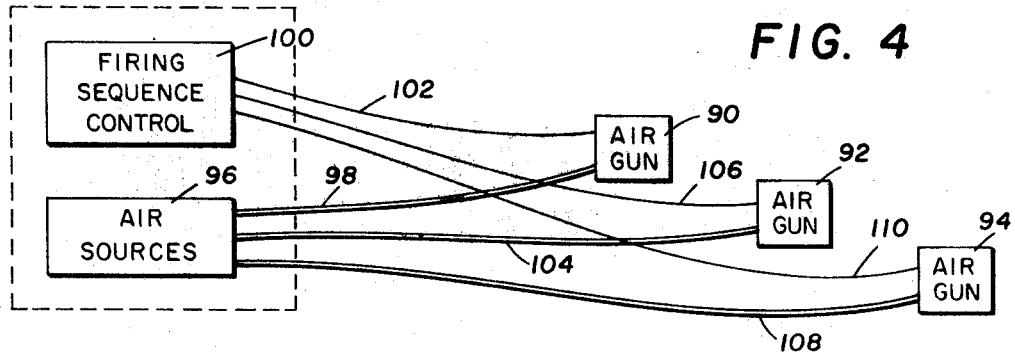
FIG. 4 is a block diagram of the sequential firing system of the invention.

FIG. 1 illustrates a seismic exploration system according to the invention comprising a vessel 10 streaming a cable 12 along which floats 14a–d are affixed at spaced intervals. Cable 12 is wound at one end on a reel 16 which is controlled by a suitable motor. Air guns, or other suitable types of seismic wave generators, 16a–d are attached by cables or chain links from respective ones of the floats 14a–14d. Although only four air guns are shown for simplicity of illustration, in the preferred embodiment, 24 air guns are utilized. Compressed air is fed to each of the air guns 16a–16d via an air line 18 which is attached at one end to an air compressor (not shown) located aboard the vessel 10. While only a single air line 18 is illustrated, in some instances it will be desirable to provide a separate air line for each of the air guns 16a–d.

The vessel 10 also streams a cable 20 along the seismic exploration traverse, the cable 20 being attached to a conventional streamer 22 which contains a plurality of acoustic receivers or hydrophones. The hydrophones in the streamer 22 generate electrical signals in response to reception of acoustic reflections caused by the generation of acoustic signals from the air guns 16a–d. The electrical signals are received onboard the vessel 10 and recorded in the well-known manner for suitable processing of the seismic data.

The air guns used in the present invention may comprise any suitable conventional type of air gun, such as the guns disclosed in U.S. Pat. No. 3,379,273 issued Apr. 23, 1968 to Chelminski. Alternatively, the guns may be of the type wherein several small air bubbles coalesce into one large bubble as disclosed in the copending Pat. application Ser. No. 601,092, filed Dec. 12, 1966 by Brock et al. and assigned to the present assignee, now U.S. Pat. No. 3,437,170 issued Apr. 8, 1969. Preferably, the guns are of the type wherein electrical signals open solenoid valves to allow compressed air to be suddenly emitted from a chamber within the gun, thereby creating the desired underwater acoustic signal.

Although in the system to be described, the preferred fluid to be emitted from the acoustic signal generators is pressurized air or other gases, it will be understood that in some cases combustible fluid such as diesel fluid may be employed in the chamber of the generators and ignited to create a high gas pressure to generate an acoustic pulse as is known in the art.

FIGS. 2a–2c illustrate typical pressure wave characteristics of three air guns having different volume capacities. FIG. 2a illustrates the pressure wave generated by a typical air gun having a volume capacity of 10 cubic inches, with the air gun disposed about 22 feet under the surface of the water and with an air chamber pressure of about 1,900 p.s.i.g. The resulting pressure wave was received by a hydrophone disposed about 25 feet under the surface of the water.

Approximately 10 milliseconds after the application of the electrical firing pulse to the air gun, a relatively high, sharp, pressure pulse 30 is generated due to the initial generation of air bubbles. Subsequent pressure spikes 32–38 of much lower pressure are then generated due to the coalescence of the air bubbles into a single bubble. After coalescence, a first high energy bubble oscillation designated as 40 is generated at about 50 milliseconds after the firing pulse. Other bubble oscillations designated as second, third and fourth oscillations subsequently occur, but have much lower amplitude and energy content than bubble oscillation 40.

The acoustic energy released from the air gun during the bubble establishment, as represented by pressure spikes 30–38 is about 39 percent of the total energy output of the air gun, while the energy released during the first bubble oscillation 40 is about 42 percent of the total energy output. The first bubble oscillation 40 has slightly lower power than the initial spike 30, but has substantially greater acoustic energy and less noise. The initial spike 30 is extremely noisy, and includes a broad band of frequencies including substantial amounts of seismically useless high frequencies. The acoustic energy outputs from the first bubble oscillation are predominantly composed of seismically useful low frequencies.

FIG. 2b illustrates the pressure wave generated by a typical air gun having a volume capacity of 20 cubic inches at a depth of about 22 feet and at a chamber pressure of 1,900 p.s.i.g., the pressure wave received by a hydrophone at about 25 feet below the surface of the water. An initial high spike 50 is again generated approximately 10 milliseconds after the firing pulse, and a number of small amplitude pressure spikes 52–58 are subsequently generated during the bubble establishment period. A first high energy bubble oscillation 60 then occurs at about 61 milliseconds after the firing command. A number of secondary bubble oscillations subsequently occur after the formation of the first bubble oscillation 60.

Again, the first bubble oscillation 60 has substantially greater energy content than the spike 50, and is much less noisy. Although the spike 50 occurs at substantially the same time as the spike 30 shown in FIG. 2a, it is important to note that the first bubble oscillation 60 occurs about 11 milliseconds later than the first bubble oscillation 40. The first bubble oscillation 60 also has a greater amplitude than the first bubble oscillation 40.

In a similar manner, FIG. 2c illustrates a pressure wave generated by a typical air gun of the type previously described and under similar circumstances previously described, with a volume capacity of approximately 40 cubic inches. An initial pressure spike 70 occurs at about 10 milliseconds after the initiation of the firing pulse. Additionally, secondary pressure spikes 72–78 are generated during bubble establishment. A first high energy bubble oscillation 80 occurs at about 73 milliseconds after the firing command and is of a substantially higher energy than the first bubble oscillations illustrated in FIGS. 2a and 2b.

It is important to note that the first bubble oscillation 80 occurs about 23 milliseconds after the occurrence of the first bubble oscillation 40, and about 12 milliseconds after the occurrence of the first bubble oscillation 60. Again, secondary bubble oscillations subsequently occur after the first bubble oscillation 80.

Figure 3:
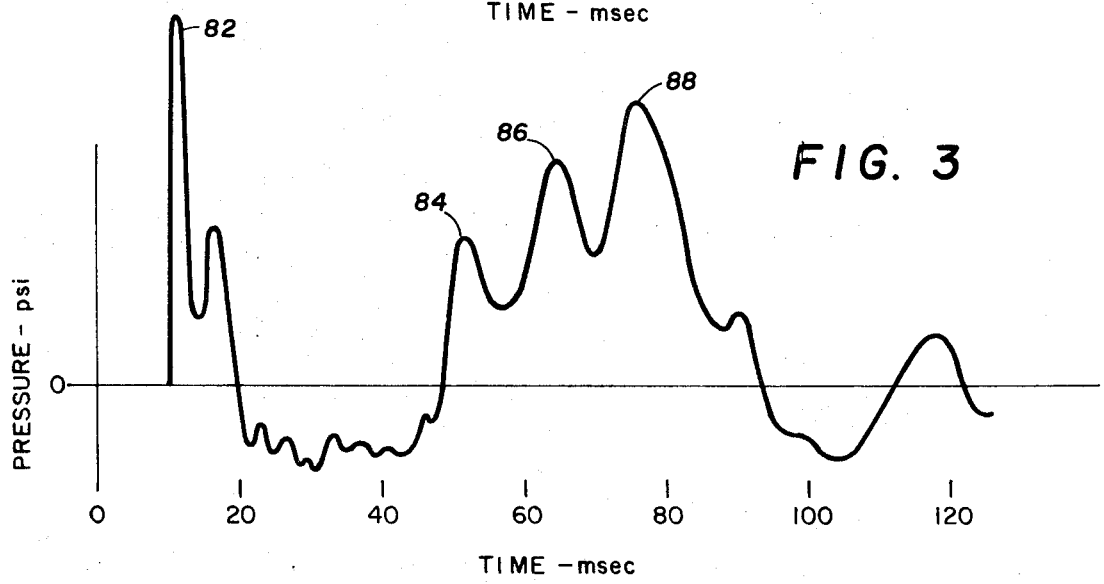
FIG. 3 illustrates a resultant pressure wave resulting from a prior art simultaneous firing of a plurality of air guns.

FIG. 3 illustrates the resultant pressure wave emanating from an array of the three air guns described with respect to FIGS. 2a–2c when the three guns are fired simultaneously. It will be noted that at about 10 milliseconds after firing, an enhanced sharp pressure spike 82 occurs as a result of the combining of the pressure spikes 30, 50 and 70, all of which occur at essentially the same time. In the time interval between 20 and 50 milliseconds, a low-pressure wave results due to some cancellation occurring between the bubble establishment portions of the three pressure waves. After about 50 milliseconds a pressure pulse 84 occurs, at about 61 milliseconds a pressure pulse 86 occurs and about 73 milliseconds a pressure pulse 88 occurs as a result of the first bubble oscillations 40, 60 and 80.

It will thus be seen that by simultaneous ignition of an air gun array according to the prior art, the lower energy, noisy initial pressure spikes are accentuated in the resultant pressure wave, while the higher energy and seismically more useful first bubble oscillations tend to be somewhat repressed due to destructive interference. The present invention delays the firing of the smaller volume capacity air guns such that the first bubble oscillations of the pressure waves generated will be enhanced, while the lower energy and noisy initial pressure spikes will tend to be repressed.

The system for accomplishing the invention is illustrated somewhat diagrammatically in FIG. 4. The system comprises three air guns 90, 92 and 94, each gun having a different volume capacity. For instance, air gun 90 will be assumed to have a 40 cubic inch volume capacity, air gun 92 a 20 cubic inch volume capacity, and gun 94 a 10 cubic inch volume capacity. Air gun 90 is connected to a source of compressed air 96 by an airline 98 and is connected to a firing sequence control circuit 100 by an electrical line 102. Air gun 92 is connected to the air source 96 by an airline 104 and to the firing sequence control by lead 106. Air gun 94 is connected to the air source 96 by an airline 108 and to the firing sequence control 100 by a lead 110.

As previously noted, the use of air guns of varying volume capacity is desirable because the frequency content, and in particular the fundamental frequency of the generated acoustic wave, is dependent upon the volume capacity of the air gun. It is desirable to generate a number of acoustic waves of various fundamental frequencies so as to provide a full spectrum of high energy acoustic pulses.

The firing sequence control 100 comprises any suitable circuit wherein electrical firing pulses may be sequentially and precisely generated. The source of electrical energy in the control circuit 100 may be capacitor banks. A suitable control system for discharging the capacitor banks is the system disclosed in U.S. Pat. No. 3,133,231, issued on May 12, 1964 to Fail et al. This system includes knobs which may be rotated in order to enable manual selection of the timing sequence of the generated electrical pulses. The electrical pulses generated by the firing sequence control 100 operate electrical solenoids within the air guns to cause the underwater emission of the desired volumes of high-pressure air of other fluids.

In operation of the system shown in FIG. 4, the air gun 90 is first fired to generate a pressure wave approximating that shown in FIG. 2c. After a delay of 12 milliseconds, an electrical pulse is supplied via line 106 to fire air gun 92, whereupon a pressure wave having the configuration of FIG. 2b is generated. After a time delay of about 23 milliseconds, an electrical firing pulse is applied via lead 110 to the air gun 94, whereupon a pressure wave corresponding to the wave shown in FIG. 2a is generated.

Figure 5:
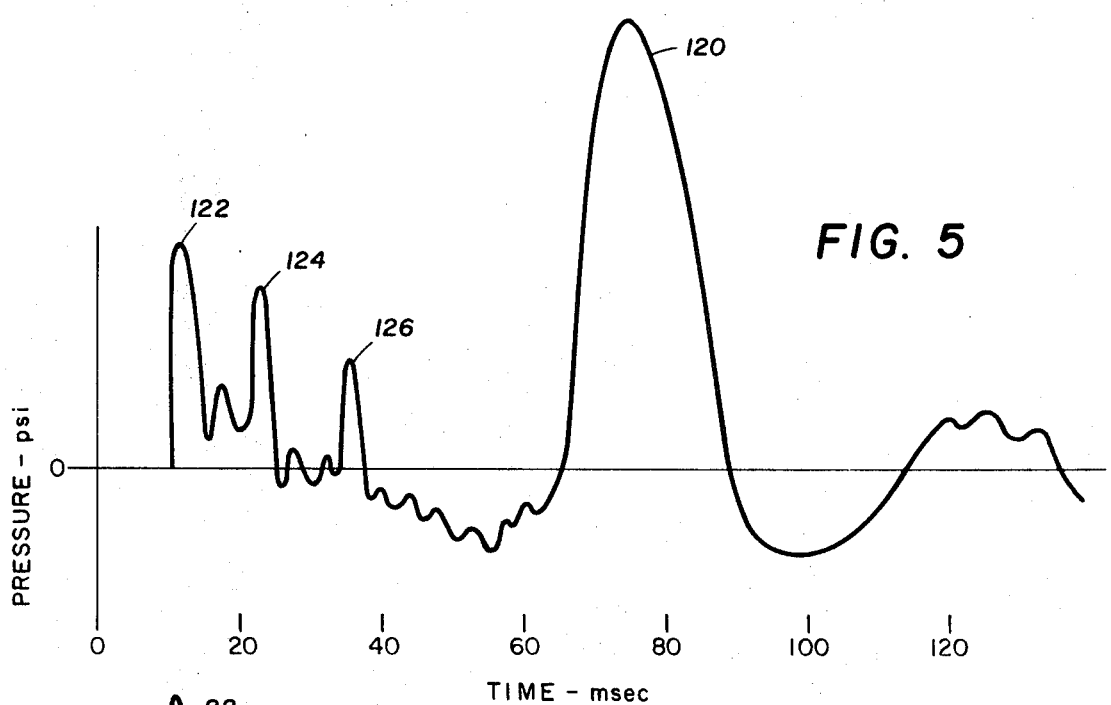
FIG. 5 is a waveform illustrating the resultant pressure wave created by the sequential firing of the invention.

Due to the delays provided to the firing of air guns 92 and 94, the first bubble oscillations generated by the air guns occur generally simultaneously, thereby tending to add in the resultant pressure wave. This resultant, or composite, wave is illustrated in FIG. 5, wherein it may be seen that an extremely high energy pulse 120 occurs in the resultant pressure wave at about 73 milliseconds after the first firing pulse. This pulse 120 comprises the summation of the oscillations 40, 60 and 80. The pressure spikes designated as 122, 124 and 126 are effectively minimized in importance due to their occurrence at different instances of time. The resultant pressure pulse 120 not only is a very high energy pulse, but contains desirable low frequency components which may be received by the streamer 22 in order to provide extremely meaningful seismic data.

It will be understood that although the present invention has been described with respect to three air guns, the invention may be practiced with a larger number of different types of acoustic wave generators in actual practice. As the pressure wave generated by each different air gun will vary slightly from the typical waveforms illustrated in FIGS. 2a–2c, some adjustments of the firing times of the guns will have to be made at the firing sequence control 100 to accommodate such variances. In practice, tests may be run on an array of air guns with a number of different time delay combinations in order to develop the optimum time sequence for a particular air gun array.

Whereas the specific embodiment of the present invention has been described, it will be understood that various changes and modifications will be suggested to one skilled in the art, and it is intended to cover such changes and modifications as fall within the scope of the appended claims.

1. A system for marine seismic exploration comprising:
   a. a plurality of acoustic wave generators adapted to be streamed along a marine traverse, ones of said generators operable to emit an acoustic wave, each of the waves having a first high energy oscillation which occurs a time different from the high energy oscillation of other waves,
   b. firing means operable to initiate the generation of acoustic waves from said generators, and
   c. means for delaying the firing of ones of said generators such that each of said first high energy oscillations of each of said acoustic waves occur at substantially the same time for enhancement of the resultant acoustic wave.

2. The system of claim 1 wherein said acoustic wave generators comprise air guns whereby confined volumes of high-pressure air are suddenly released underwater, ones of said air guns having different volume capacities to thereby produce acoustic waves with first high energy bubble oscillations which occur at different times after firing of said air guns.

3. The system of claim 2 and comprising:
   means for first firing the air gun having the largest volume capacity and then sequentially delaying the firing of said air guns having smaller volume capacities for time intervals dependent upon the occurrence of their first high energy bubble oscillations.

4. The method of marine seismic exploration comprising:
   a. streaming a plurality of seismic disturbance generators along a marine traverse,
   b. generating seismic disturbances from each of said generators, each of said disturbances producing a first high energy oscillation which normally occurs at a time different from the first high energy oscillation of other disturbances, c. delaying the generation of ones of said seismic disturbances so that the first high energy bubble oscillation produced by each generator occurs at generally the same time for enhancement of the resultant acoustic disturbance, and
d. receiving reflected portions of said seismic disturbances.

5. The method of claim 4 wherein said seismic disturbances are generated by suddenly releasing confined volumes of high-pressure gas underwater.

6. The method of claim 5 wherein ones of said confined volumes are of different capacities to thereby produce seismic disturbances having different pressure wave characteristics.